United States Patent
Fujii (12)

(10) Patent No.: US 7,767,963 B1
(45) Date of Patent: Aug. 3, 2010

(54) THERMAL IMAGING CAMERA INTERNAL DAMPING SYSTEM

(75) Inventor: Alan J. Fujii, Santa Ana, CA (US)

(73) Assignee: Draeger Safety, Inc., Pittsburgh, PA (US)

( * ) Notice: Subject to any disclaimer, the term of this patent is extended or adjusted under 35 U.S.C. 154(b) by 768 days.

(21) Appl. No.: 11/608,405

(22) Filed: Dec. 8, 2006

(51) Int. Cl.
*H01L 31/0203* (2006.01)
*G03B 17/02* (2006.01)

(52) U.S. Cl. .................. 250/330; 396/535; 396/541

(58) Field of Classification Search .................. 396/535, 396/541; 250/330
See application file for complete search history.

(56) References Cited

U.S. PATENT DOCUMENTS

| | | | |
|---|---|---|---|
| 3,017,513 A | 1/1962 | Messelt |
| 3,489,008 A | 1/1970 | Thornton et al. |
| 3,560,738 A | 2/1971 | Strange |
| 3,752,983 A | 8/1973 | Yanez |
| 4,288,102 A | 9/1981 | Ramer |
| 4,458,998 A | 7/1984 | Tanaka et al. |
| 4,586,117 A | 4/1986 | Collins |
| 4,855,718 A | 8/1989 | Cholin |
| 5,089,914 A | 2/1992 | Prescott |
| 5,348,206 A | 9/1994 | Scherer |
| 5,389,788 A | 2/1995 | Grinberg et al. |
| 5,422,484 A | 6/1995 | Brogi et al. |
| 5,485,237 A | 1/1996 | Adermann et al. |
| 5,561,294 A | 10/1996 | Iddan |
| 5,570,948 A | 11/1996 | Menke et al. |
| 5,637,871 A | 6/1997 | Piety et al. |
| 5,675,149 A | 10/1997 | Wood et al. |
| 5,717,308 A | 2/1998 | Nishitani et al. |
| 5,732,302 A | 3/1998 | Yokota |
| 5,763,882 A | 6/1998 | Klapper et al. |
| 5,856,811 A | 1/1999 | Shih et al. |
| 5,907,721 A | 5/1999 | Schelling et al. |
| 5,949,582 A | 9/1999 | Coombs |
| 6,014,522 A | 1/2000 | Reber, II |
| 6,016,160 A | 1/2000 | Coombs et al. |
| 6,023,288 A | 2/2000 | Coombs et al. |
| D424,081 S | 5/2000 | Gordon |
| 6,115,559 A | 9/2000 | Balling et al. |
| 6,133,569 A | 10/2000 | Shoda et al. |

(Continued)

FOREIGN PATENT DOCUMENTS

EP 0 622 030 B1 5/1997

(Continued)

OTHER PUBLICATIONS

Tyco, Scott Health & Safety, "Eagle Imager 160", Bid Specifications, Jun. 2003.

(Continued)

*Primary Examiner*—David P Porta
*Assistant Examiner*—David S Baker
(74) *Attorney, Agent, or Firm*—Caesar, Rivise, Bernstein, Cohen & Pokotilow, Ltd.

(57) ABSTRACT

A thermal imaging camera is provided which includes an outer housing, a core disposed substantially entirely within the housing, and a plurality of damping members disposed between the housing and the core to substantially fully suspend the core in the housing with the damping members.

5 Claims, 4 Drawing Sheets

U.S. PATENT DOCUMENTS

| | | | |
|---|---|---|---|
| 6,144,031 | A | 11/2000 | Herring et al. |
| 6,195,206 | B1 | 2/2001 | Yona et al. |
| 6,232,602 | B1 | 5/2001 | Kerr |
| 6,255,650 | B1 | 7/2001 | Warner et al. |
| 6,292,311 | B1 | 9/2001 | Bohn et al. |
| 6,349,180 | B1 | 2/2002 | Jabbour et al. |
| 6,411,332 | B1 | 6/2002 | Whitby et al. |
| 6,456,261 | B1 | 9/2002 | Zhang |
| D464,666 | S | 10/2002 | Salapow |
| 6,476,391 | B1 | 11/2002 | Zhang |
| 6,486,473 | B2 | 11/2002 | Salapow et al. |
| D472,911 | S | 4/2003 | Bielefeld |
| 6,606,115 | B1 | 8/2003 | Alicandro et al. |
| D479,548 | S | 9/2003 | Bielefeld |
| D481,053 | S | 10/2003 | Colburn et al. |
| 6,649,912 | B2 | 11/2003 | Salapow et al. |
| D483,782 | S | 12/2003 | Lannestedt et al. |
| 6,707,044 | B2 | 3/2004 | Lannestedt et al. |
| 6,720,878 | B2 | 4/2004 | Jumpertz |
| 6,787,775 | B1 | 9/2004 | Bielefeld et al. |
| 6,849,849 | B1 | 2/2005 | Warner et al. |
| 6,859,327 | B2 | 2/2005 | Del Bianco et al. |
| 6,956,610 | B1 | 10/2005 | Walls |
| 7,250,603 | B1 * | 7/2007 | Nugent .................. 250/330 |
| 2001/0046385 | A1 | 11/2001 | Salapow et al. |
| 2002/0162963 | A1 | 11/2002 | Lannestedt et al. |
| 2002/0190866 | A1 | 12/2002 | Richardson |
| 2002/0195562 | A1 | 12/2002 | Salapow et al. |
| 2003/0122958 | A1 | 7/2003 | Olita et al. |
| 2004/0124359 | A1 | 7/2004 | Hamrelius et al. |
| 2005/0099803 | A1 | 5/2005 | Krieger |
| 2005/0219399 | A1 | 10/2005 | Sato et al. |

FOREIGN PATENT DOCUMENTS

| | | | |
|---|---|---|---|
| EP | 0 458 925 | B1 | 9/1998 |
| EP | 1 300 716 | A1 | 4/2003 |
| GB | 2 252 836 | A | 8/1992 |
| JP | 2002-199258 | | 7/2002 |
| JP | 2002-199385 | | 7/2002 |
| JP | 2002-202188 | | 7/2002 |
| JP | 2004-173203 | A | 6/2004 |
| WO | WO 91/09389 | | 6/1991 |
| WO | WO 00/04493 | | 1/2000 |
| WO | WO 00/37970 | | 6/2000 |
| WO | WO 00/45211 | | 8/2000 |
| WO | WO 01 40844 | A1 | 6/2001 |
| WO | WO 01/42845 | A1 | 6/2001 |
| WO | WO 01/63335 | A2 | 8/2001 |
| WO | WO 01/65834 | A2 | 9/2001 |
| WO | WO 01/71432 | A1 | 9/2001 |
| WO | WO 02/05013 | A2 | 1/2002 |
| WO | WO 03/060590 | A2 | 7/2003 |
| WO | WO 03/073751 | A1 | 9/2003 |
| WO | WO 2004/025353 | A1 | 3/2004 |
| WO | WO 2004/062273 | A1 | 7/2004 |
| WO | WO 2004/068433 | A1 | 8/2004 |

OTHER PUBLICATIONS

"Emergency Responder Thermal Imaging", Fall, 2005, vol. 1 No. 3.
Bullard T3 Series Accessories,website print-out: www.bullard.com/thermalimager/select_buy/t3accessories.shtml, 4 sheets, Jan. 2006.
ISG Thermal System USA, Inc., "Elite Tsalisman," Video Transmission & Video Capture, product literature, 5 sheets, May 2, 2005.
Inline Systems "Bugeye" Thermal Pest Camera, website print-out: www.inline.com.au/industrial/indust_bugtherm.html, Jan. 20, 2006.
Bullard, various website sheets, website: www.bullard.com, Nov. 2004, 6 sheets.
MSA Auer, Video Capture, Safety Pin online, literature, 2 sheets, Jan. 20, 2006.
Bullard, various website pages, 2004, 6 sheets, website: www.bullard.com.

* cited by examiner

THERMAL IMAGING CAMERA INTERNAL DAMPING SYSTEM

BACKGROUND OF THE INVENTION

The present invention is directed to a damping system for a thermal imaging camera. More particularly, the present invention is directed to an internal damping system for a thermal imaging camera to provide an adequate ability to withstand shock and vibration that would come under strenuous use of the camera, for example, when a camera is dropped.

Prior thermal imaging cameras have used rigid foam for both positioning and protection of the core of a thermal imaging camera. The rigid foam provides a basic form of protection but cannot withstand repeated impact since the rigid foam has substantially no memory to rebound to original shape or position. Use of flexible foam improves the memory abilities but does not have any real damping capabilities.

Numerous patent documents disclose padding (including for use as insulation) or shock absorbing in general. For example, International Publication No. WO 2004/062273 (Raytheon Company) teaches a system for effecting temperature control in a camera which includes an outer housing having a thermally insulating foam material between the housing and its camera core. However, use of the foam material appears to be only for thermal insulation purposes, not for damping.

U.S. Pat. No. 3,489,008 (Thornton et al.) is directed to a radiation temperature sensor. The sensor includes a housing having insulating plastic foam surrounding it. An outer shell surrounds the plastic foam. The foam is poured through vent holes in the rear of the outer shell. The foam appears to be for insulation purposes. No shock or vibration appears to be mentioned.

U.S. Pat. No. 5,907,721 (Schelling et al.) is directed to a protective housing for a consumer camera which includes a pouch for containing the camera. The pouch is constructed to be a waterproof, shock absorbent protective housing constructed of rubber or a plastic, flexible, resilient, waterproof, shock absorbing material.

U.S. Pat. No. 6,014,522 (Reber, II) is directed to a protective housing for a consumer camera that includes a pouch for containing the camera constructed from a flexible material that is flexible enough to allow the camera to be operated through the material. The pouch has an external U-shaped holder constructed from rubber or a flexible material that is thicker and less flexible than the pouch material to provide shock absorption for a camera.

U.S. Pat. No. 6,115,559 (Balling et al.) is directed to a camera having a protective outer housing with a shock damping insert. Here, a one-piece shock-damping elastomeric member is placed over the front, top and rear of an inner housing. A protective outer housing is placed over the inner housing and the elastomeric member.

U.S. Pat. No. 6,349,180 (Jabbour et al.) is directed to a camera having a flexible shell. The flexible shell protects the camera from damage. The shutter of the camera is triggered by a mechanism that is operated by deforming the flexible shell.

Numerous patent documents owned by Mine Safety Appliances Company by Thomas Salapow are directed to a thermal imaging camera and include shock-resistance features. See International Publication No. WO 01/65834, U.S. Patent Application No. 2002/0195562, U.S. Design Pat. No. D464,666, U.S. Pat. No. 6,486,473, U.S. Pat. No. 6,649,912 and U.S. Patent Application No. U.S. 2001/0046385. As can be seen, for example, in U.S. Pat. No. 6,486,473, there is shown a thermal imaging camera having resilient material placed over or around all projecting portions of the thermal imaging camera such that when the thermal imaging camera is contacted with a plane, the resilient material will first contact the plane regardless of the orientation of the thermal imaging camera relative to the plane. The housing has the resilient materials surrounding the sides, front end and rear end and bottom of the battery compartment. The resilient material may be in the form of elastomeric bumpers that have shock absorbing properties. The resilient bumpers are shown, for example, at call outs 430, 530 and 730 of FIG. 7.

U.S. Pat. No. 6,787,775 (along with U.S. Design Pat. D472,911 and D479,548) (assigned to Bullard) is directed to a portable thermal imaging camera having shock-absorbing features.

U.S. Pat. No. 6,956,610 (Walls) is directed to a shock mounting system for a CCD camera. Here, an elastomeric boot is molded to fit between the CCD camera assembly and its housing.

Numerous patent documents are directed to internal protection of thermal imaging cameras. For example, U.S. Pat. No. 4,458,998 (Tanaka et al.) is directed to a mechanical shock absorbing device for a camera. Here, a shock absorbing device that acts on a shock resulting from movement includes a counterweight that has greater inertial mass than a moving body. A drive moves the counterweight and moving body in synch with each other. This device is used to absorb shock from a shutter in the camera.

U.S. Pat. No. 5,485,237 (Adermann et al.) is directed to a protective camera housing designed to protect a film or video camera while it films in close proximity to a blast in an underground mine or other destructive environment. A shock absorbing gasket between all body plates and chassis members and rubber mounting pods give protection against explosion debris and blast shock waves.

U.S. Pat. No. 5,732,302 (Yokota) is directed to a camera that includes a structural body composed of a plurality of integrally coupled functional components. Slender rods extend between the structural body and a cover. The slender rods are rigid enough to position the structural body and a cover with respect to each other, and flexible enough to be elastically deformable when shocks are applied to them.

U.S. Pat. No. 5,856,811 (Shih et al.) is directed to a visual display and helmet assembly configured to function in the presence of a harsh environment including vibration and shock.

U.S. Pat. No. 6,787,775 (Bielefeld et al.), noted above, is directed to a portable TIC having a shock absorbing lens mount that minimizes the transfer of impact forces to its lens. The lens of the TIC is encased in a circumferential grommet and then received in the cavity defined by the housing such that the lens is essentially suspended within the cavity. Since the lens is suspended, little or no force is translated to the lens if the TIC is dropped or otherwise impacted. No other shock absorbing or damping features are described in this patent.

U.S. Pat. No. 6,956,610 (Walls) is directed to a shock mounting system for a CCD camera. The system comprises a pair of support plates for spanning the junctions between the various components (prisms, etc.) of a standard CCD camera. An elastomeric boot is molded to fit between the CCD camera assembly and its housing.

All references cited herein are incorporated herein by reference in their entireties.

BRIEF SUMMARY OF THE INVENTION

Broadly, a thermal imaging camera is provided which includes an outer housing, a core disposed substantially entirely within the housing, and a plurality of damping members disposed between the housing and the core to substantially fully suspend the core in the housing with the damping members.

A thermal imaging camera is also provided which includes an outer housing having a lens end and a display end. A core is disposed within the housing where the core has a nose end and a display end. At least three core damping members are provided where each core damping member has core end and a housing end. Each core damping member contacts the core at its core end and the housing at its housing end. The core damping members provide for damping of the housing relative to the core in three hundred sixty degrees. In the event of an impact force to any point on the housing, an energy force wave created by the impact force is transmitted through the housing, through the core damping members, to the core, thereby allowing a time of increase of load absorbed by the damping members resulting in a lower energy spike to the core.

A nose damping member is preferably disposed between the nose end of the core and the housing and provides for axial positioning of the core lens with respect to the housing and also provides for limited axial pivotal movement of the core with respect to the housing upon an impact force to the housing. It also provides for damping of the core with respect to the housing upon an impact to the lens end of the outer housing.

Preferably, the damping members are secured to the core, but not to the housing. Preferably, a display end bumper disposed on the display end of the core is provided to dampen impacts applied to the display end of the housing. Finally, the display end bumper is preferably a hemispherical bumper which mates to a receiving cup in a bracket adjacent to a display mounted to the display end of the housing.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The internal damping system for a thermal imaging camera (TIC) in accordance with the present invention provides the ability to withstand substantial shock and vibration that the TIC would encounter in use in a hostile environment expected to be encountered by firefighters. For example, the TIC would likely be subject to dropping or other substantial shocks and vibration. The internal damping system of the present invention is useful for spreading the energy load to the camera core resulting from the impact of such a drop over a greater area thus reducing the maximum energy spike to the core of the TIC. The preferred embodiment of the present invention includes multiple core damping members mounted between the back of the core and the outer housing and a nose damping member mounted to the front of the core adjacent to the outer housing. The nose damping member allows for axial positioning of the core lens and the ability to allow the axial pivoting of the core due to impact force. The nose damping member also provides damping for a front impact. The multipoint core damping members also provide for axial positioning of the core and allow damping to occur in a complete three hundred sixty degree range of movement of the core with respect to the housing. In the event of an impact force to the TIC, the energy force wave is transmitted to the housing and impacted into the core damping members and the nose damping member, allowing a time of increase of load absorbed by the dampers resulting in a lower energy spike to the core.

The invention will be illustrated in more detail with reference to the following embodiment, but it should be understood that the present invention is not deemed to be limited thereto.

Figure 1:
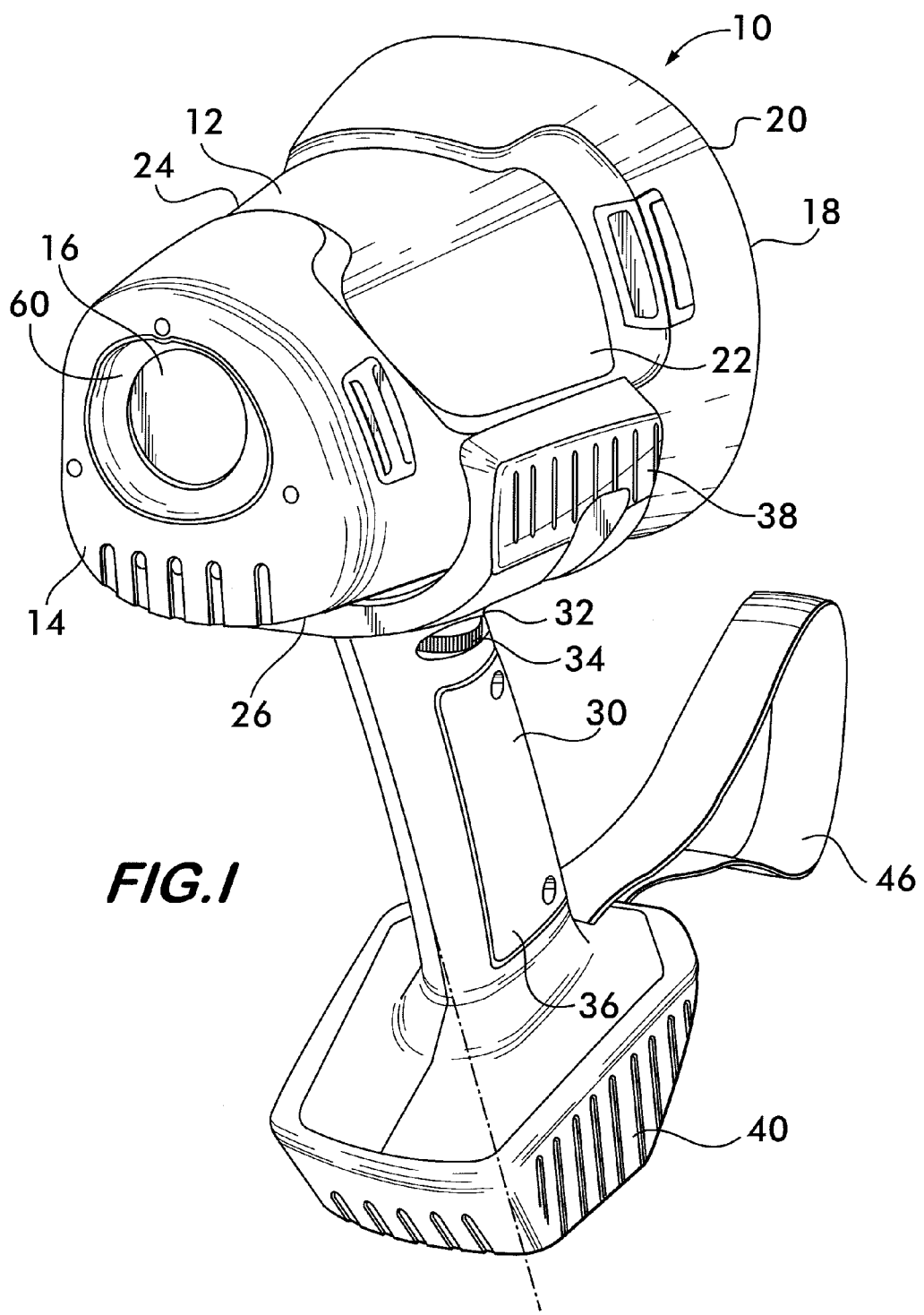
FIG. 1 is an isometric view of a thermal imaging camera in accordance with a preferred embodiment of the present invention.

Referring now to the drawings wherein like part numbers refer to like elements throughout the several views, there is shown in FIG. 1, a TIC 10 in accordance with a first preferred embodiment of the present invention.

Figure 2:
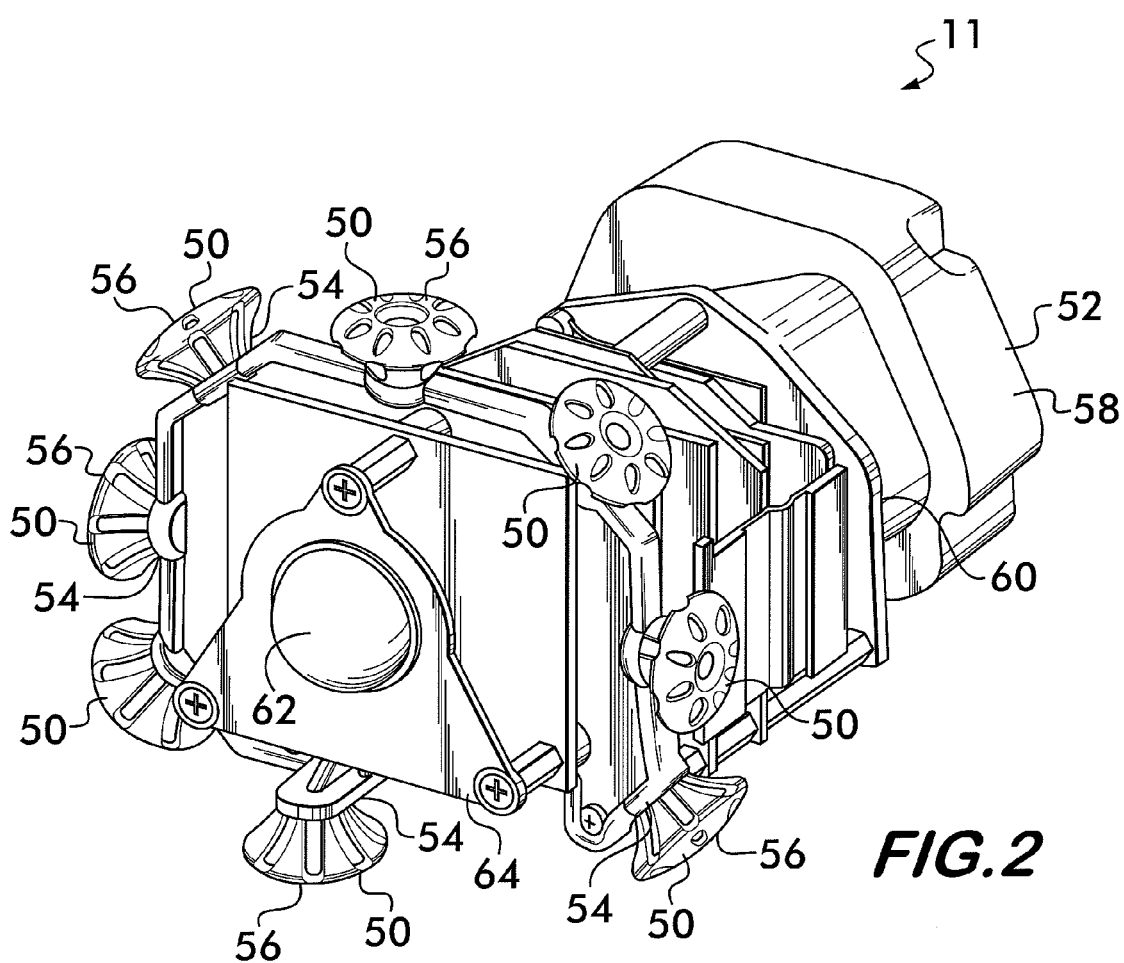
FIG. 2 is an isometric view of the thermal imaging camera core and internal damping system of FIG. 1.
Figure 3:
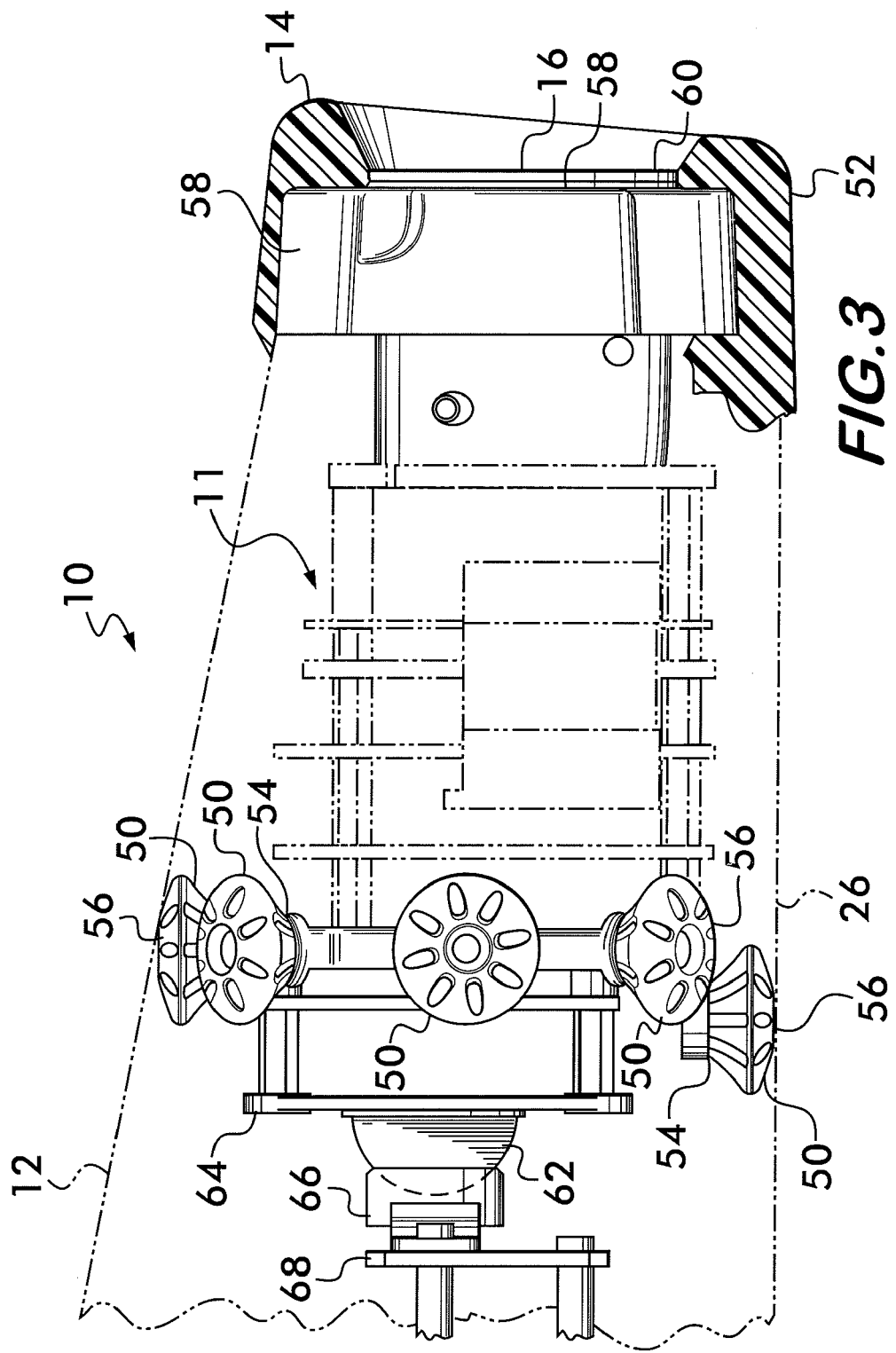
FIG. 3 is a front, elevation, partially cutaway view of the thermal imaging camera core and internal damping system of FIG. 1.
Figure 4:
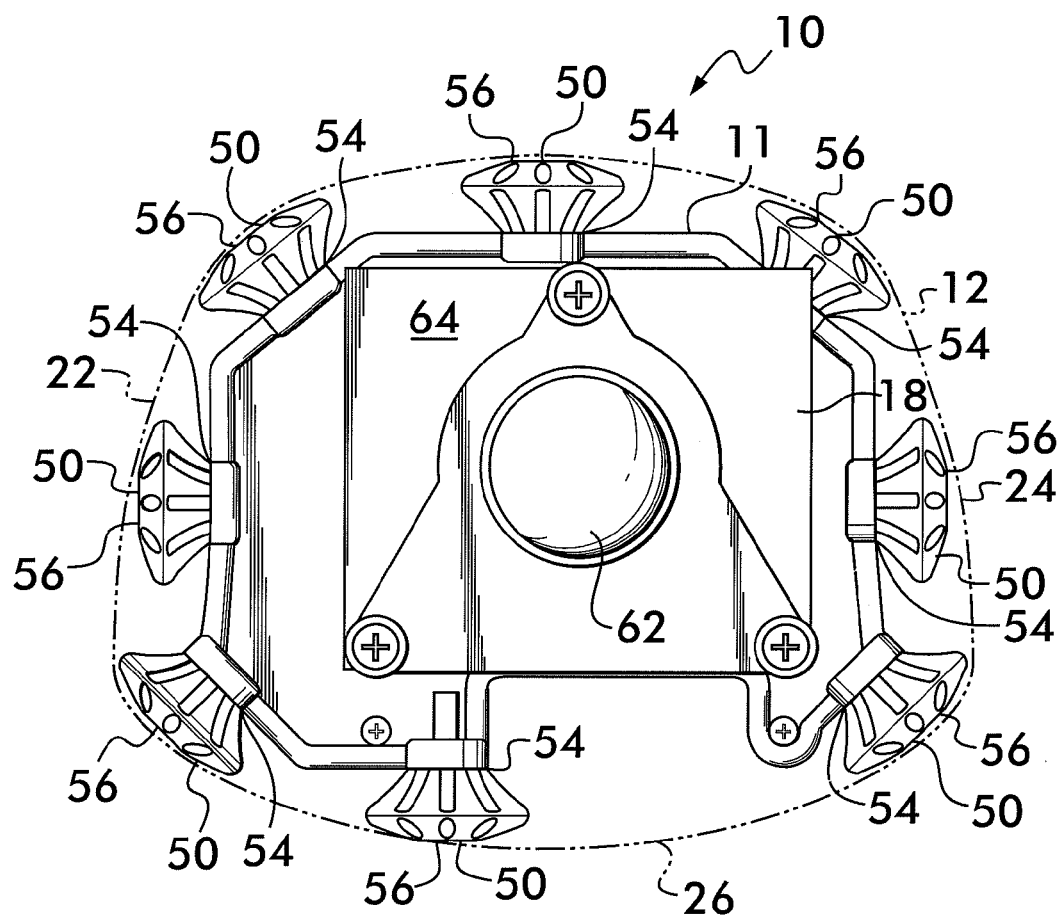
FIG. 4 is a rear elevation view of the thermal imaging camera core and internal damping system of FIG. 1.

As can be seen in FIG. 1, the TIC 10 includes a housing 12 having a front surface 14 having a lens 16, a rear surface 18 having a display 20, a pair of side surfaces 22, 24 between the front surface 14 and the rear surface 18, and a bottom surface 26. Internal to the TIC 10 is a core 11 (see FIGS. 2-4) having a grid having an array of heat sensors. The grid is located in the core 11 within in the housing 12. As is typical in conventional TICs, the heat sensors each generate a signal that is proportional to the heat sensed. The lens 16 focuses infrared radiation on the grid. The display 20 is connected to the grid and displays a real-time image of the heat sensed by each of the heat sensors on the grid to form an image of the heat sensed by the grid.

A handle 30 extends from the bottom surface 26 of the housing 12. The handle 30 has a first end 32 that is attached to the housing 12. Preferably, the handle 30 is removable. For example, the handle 30 may be held on to the housing 12 with a ¼-20 thumb screw 34 that is attached to a ¼-20 threaded hole in the housing 12. That is, a tripod-type mount commonly found in commercial and professional film and digital cameras. Importantly, the first end 32 of the handle 30 has one or more bumpers 38. The first end of the handle 30 preferably wraps around the sides of the housing 12 and has integral side bumpers 38. The side bumpers 38 extend outwardly from the longitudinal axis of the handle 30 and provide substantial protection to the TIC, particularly in this configuration because the handle 30 (including its side bumpers 38) is independent of the TIC 10 and its housing 12.

The handle 30 also has a second end 36. The second end 36 of the handle 30 also has bumpers 40 integral to the handle. As discussed, preferably, the handle 30 is removable such that the TIC 10 may be used with or without the handle 30. Preferably, bumpers 38, 40 are attached to the handle 30. Since use of the handle is particularly useful for a user who is crawling, the additional protection of bumpers 38, 40 that are located on the handle 30 are particularly beneficial. When the handle is removed, the shock and vibration resistance of the TIC is somewhat less. Without the handle 30, the dimensions of the TIC are substantially smaller, thereby offering the advantages of a smaller sized and a more portable unit. However, the present invention addresses the problem of lesser shock resistance, and is available whether or not the handle 30 is used.

A strap 46 may be attached to the handle 30, preferably, extending off the back of the handle 30 such that a user can have the strap 46 connected to his or her wrist while the TIC 10 is in a position for use.

The internal damping system for the TIC of the present invention includes a plurality of core damping members 50 and/or a nose damping member 52 disposed between the housing 12 and the core 11 to substantially fully suspend the core 11 in the housing 12 with the damping members 50, 52. At least three core damping members 50 must be used, where each core damping member 50 has a core end 54 and a housing end 56. Each core damping member 50 contacts the core 11 at its core end 54 and the housing 12 at its housing end 56. The core damping members 50 therefore provide for damping of the housing 12 relative to the core 11 in three hundred sixty degrees. In the event of an impact force to any point on the housing 12, an energy force wave created by the impact force is transmitted through the housing 12, through the core damping members 50 to the core 11 thereby allowing a time of increase of load absorbed by the damping members 50, 52 resulting in a lower energy spike to the core 11.

For example, the core damping members 50 are made from thirty durometer shore 00 synthetic viscoelastic urethane polymer such as that manufactured by Sorbothane. The nose damping member may be made from, for example, a highly damped thermoplastic vinyl such as Isodamp C-1002 made by E-A-R Specialty Composites.

The nose damping member 52 is disposed between the nose end 58 of the core 11 and the housing 12. The nose damping member 52 provides for axial positioning of the lens 16 with respect to the housing 12 and provides limited axial pivotal movement of the core 11 with respect to the housing 12 upon an impact force to the housing 12 and provides for damping of the core 11 with respect to the housing 12 upon an impact to the lens end 60 of the outer housing 12.

In a preferred embodiment, the damping members 52, 54 are secured to the core 11, but not to the housing 12. This provides for easy disassembly of the core 11 from the housing 12.

Preferably, the TIC 10 includes a display end bumper 62 disposed on the display end 64 of the core 11 to dampen impacts applied to the display end 64 of the housing 12. The display end bumper 62 is a hemispherical bumper which mates to a receiving cup 66 in a bracket 68 adjacent to a display mounted to the display end 64 of the housing 12. Display end bumper 62 may be made from, for example, a synthetic viscoelastic urethane polymer such as that manufactured by Sorbothane.

While the invention has been described in detail and with reference to specific examples thereof, it will be apparent to one skilled in the art that various changes and modifications can be made therein without departing from the spirit and scope thereof.

What is claimed is:

1. A thermal imaging camera, comprising:
   (a) an outer housing having a lens end and a display end;
   (b) a core disposed within the housing, said core having a nose end and a display end;
   (c) at least three core damping members, each core damping member having a core end and a housing end, each core damping member contacting the core at its core end and the housing at its housing end, said core damping members providing for damping of the housing relative to the core in three hundred sixty degrees; and
   (d) a nose damping member disposed between the nose end of the core and the housing, the nose damping member providing for axial positioning of the core lens with respect to the housing and providing limited axial pivotal movement of the core with respect to the housing upon an impact force to the housing and providing for damping of the core with respect to the housing upon an impact to the lens end of the outer housing;
   whereby, in the event of an impact force to any point on the housing, an energy force wave created by the impact force is transmitted through the housing, through the core damping members to the core thereby allowing a time of increase of load absorbed by the damping members resulting in a lower energy spike to the core.

2. A thermal imaging camera, comprising:
   (a) an outer housing having a lens end and a display end;
   (b) a core disposed within the housing, said core having a nose end and a display end;
   (c) at least three core damping members, each core damping member having a core end and a housing end, each core damping member contacting the core at its core end and the housing at its housing end, said core damping members providing for damping of the housing relative to the core in three hundred sixty degrees; and
   (d) a display end bumper disposed on the display end of the core to dampen impacts applied to the display end of the housing, wherein the display end bumper is a hemispherical bumper which mates to a receiving cup in a bracket adjacent to a display mounted to the display end of the housing;
   whereby, in the event of an impact force to any point on the housing, an energy force wave created by the impact force is transmitted through the housing, through the core damping members to the core thereby allowing a time of increase of load absorbed by the damping members resulting in a lower energy spike to the core.

3. A thermal imaging camera, comprising:
   (a) an outer housing having a lens end and a display end;
   (b) a core disposed within the housing, said core having a nose end and a display end;
   (c) at least three core damping members, each core damping member having a core end and a housing end, each core damping member contacting the core at its core end and the housing at its housing end, said core damping members providing for damping of the housing relative to the core in three hundred sixty degrees;
   (d) a nose damping member disposed between the nose end of the core and the housing, the nose damping member providing for axial positioning of the core lens with respect to the housing and providing limited axial pivotal movement of the core with respect to the housing upon an impact force to the housing and providing for damping of the core with respect to the housing upon an impact to the lens end of the outer housing; and
   (e) wherein the damping members are secured to the core, but not to the housing;
   whereby, in the event of an impact force to any point on the housing, an energy force wave created by the impact force is transmitted through the housing, through the core damping members to the core thereby allowing a time of increase of load absorbed by the damping members resulting in a lower energy spike to the core.

4. The thermal imaging camera of claim 3, including a display end bumper disposed on the display end of the core to dampen impacts applied to the display end of the housing.

5. The thermal imaging camera of claim 4, wherein the display end bumper is a hemispherical bumper which mates to a receiving cup in a bracket adjacent to a display mounted to the display end of the housing.

* * * * *